April 13, 1948. W. J. MILLER 2,439,407
DINNERWARE FINISHING APPARATUS
Original Filed March 29, 1935 5 Sheets-Sheet 1

INVENTOR
WILLIAM J. MILLER
BY George J. Groninger
ATTORNEY

Patented Apr. 13, 1948

2,439,407

UNITED STATES PATENT OFFICE 2,439,407

DINNERWARE FINISHING APPARATUS

William J. Miller, Pittsburgh, Pa., assignor to Miller Pottery Engineering Company, Swissvale, Pa., a corporation of Pennsylvania Original application March 29, 1935, Serial No. 13,683. Divided and this application September 19, 1945, Serial No. 617,221

30 Claims. (Cl. 25—22)

This application is a division of my copending application Serial No. 13,683, filed March 29, 1935. It has to do with dinnerware finishing apparatus.

In the drawings:

Figure 8B is a similar view taken on line 8B—8B of Figure 8.

Figures 11 to 15 inclusive are transverse vertical sectional views of grip chucks for use in transferring ware and various other fabricating operations.

Figure 16 is a fragmentary sectional view of an attachment used for conducting air.

Figure 17 is a view in front elevation of a ware turning and finishing assembly.

Figures 18 and 19 are, respectively, views in side elevation and top plan of the apparatus of Figure 17.

Figure 20 is a side elevation of another form of ware turning and finishing assembly.

Figures 21 and 22 are, respectively, views in front elevation in the top plan of the ware turning and finishing assembly of Figure 20.

Figure 23 is a front elevation of a ware swabbing and finishing assembly.

Figure 25 is a front elevation of another form of ware turning and finishing apparatus.

Figure 26 is a side elevation of the apparatus shown in Figure 25.

Figure 27 is a detail view of a fabricating tool.

Figures 28 and 29 are views in transverse vertical section of tools used in turning and finishing the bottoms of shallow ware and the interior of deep ware.

Figure 30 is a view in elevation of the cams for the carriage of Figure 19.

Figure 31 is a view in elevation of the cams for the carriage of Figure 20.

The various fabricating units which go to make up the finishing machinery should be mounted in such order along the fabricating line as will permit each operation to be performed in proper sequence in accordance with the article of ware being produced, and the frame of the apparatus is constructed to permit interchanging of the said units as desired. If cups or analogous ware which require turning and finishing and/or handles are being produced in one or more lines, this ware is conveyed through the drier until in a leatherhard state and then transferred from the main drier to the supplemental drier or treating chamber and turned and finished while undergoing transfer at G, Figure 34. The ware is inspected and transferred back to the main drier and conveyed therethrough until dry. In the case of plates and analogous ware which may not require turning, and/or handles and like appendages, this ware completes the cycle through the main drier without interruption until dry, then passes out of the main drier and may be cleaned or otherwise treated at L, the bottoms finished at M, the edges and surfaces smoothed at N, and finally treated or cleaned at Q.

As the trays bearing the molds with ware thereon progress along the lower main fabricating line, they pass over reciprocable and rotatable chucks 62 forming part of the mold-actuating units shown by Figures 1 to 7, inclusive. The complete assembly is mounted on a skeleton frame 63 which is adjustably secured on cross supports 63a, by screw bolts 63b, extending through enlarged openings, and centering dowels 63c, the latter being removed in the event it is desired to shift the unit from its initially aligned position. The cross supports 63a are suitably adjustably secured to the base of the main frame 38 of the machine. The casting or frame 63 is provided with a bearing housing 63d for a spindle 64, see Figure 5, the lower extremity of which has secured thereon a collar 64a by means of a pin 64b, said collar supporting a thrust bearing assembly comprising a tapered collar 64c, bearing rollers 64c', a saddle 64d and spring 64e, a cover 64f being adjustably threaded into the housing against which said spring abuts, so that the spindle moves upwardly against the tension of said spring and lowers by gravity assisted by said spring.

Figures 1, 3, 5, 6, 7:
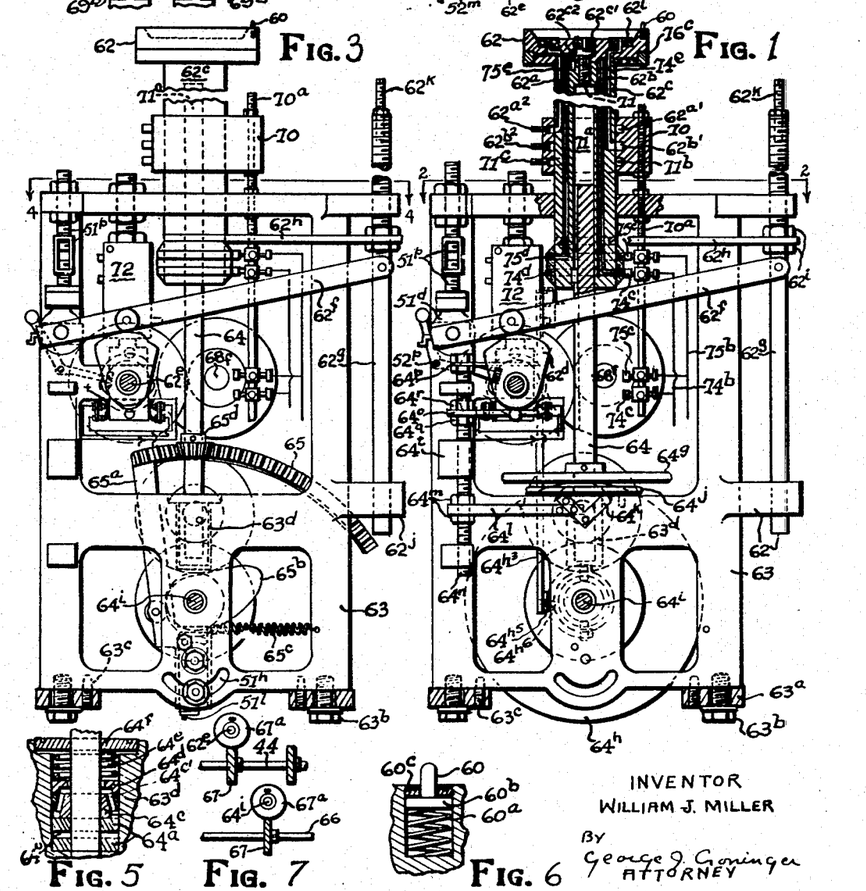
Figure 1 is a view in section and side elevation of a mold actuating or jigger assembly.
Figure 3 is a view in side elevation of another form of mold-actuating or jigger assembly.
Figures 5 and 6 are detail views of parts of the mold-actuating assembly.
Figure 7 is a reduced fragmentary detail view of a drive unit.
Figure 2:
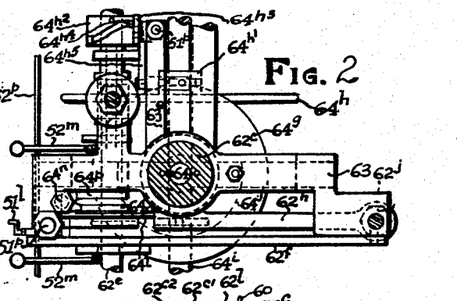
Figure 2 is a horizontal sectional plan view taken on the line 2—2 of Figure 1.
Figure 4:
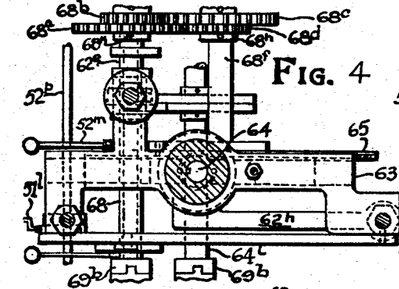
Figure 4 is a horizontal sectional plan view taken on the line 4—4 of Figure 3.

The spindle 64 is in spline-sliding engagement with a chuck spindle 62c on which the chuck 62 is secured by a screw 62c' and dowel pin 62c2, reciprocation being imparted to the chuck 62 and spindle 62c by means of a cam 62d, mounted on a cross shaft 62e having bearing in the side frame plates 38a of the main frame of the apparatus, said cam actuating a lever 62f, which is adjustably pivoted at one extremity, the pivoting assembly being supported from the frame 63, and at its opposite extremity pivotally secured to a pitman 62g, the pitman connecting with spindle 62c by means of a cross fork 62h, which is adjustably secured to said pitman by nuts 62i at its one extremity and forked into an annular groove in the spindle 62c at its opposite extremity. The pitman 62g projects through and is guided by extensions 62j of the frame 63, the upper end of said pitman having adjustably threaded therein a contact screw 62k, the function of which will later become apparent.

Rotation may be imparted to the spindle 64 in the unit illustrated in Figure 1 by means of cooperating friction gears 64g and 64h, the gear 64g being adjustably secured on the spindle 64 and the gear 64h splined for longitudinal sliding movement on a cross shaft 64i, which is preferably continuously driven, this shaft having bearings at opposite extremities in the side frame plates or beams 38a.

The friction gears 64g and 64h are brought into intermittent contact by a lever and brake assembly comprising a brake shoe 64j formed with studs for mounting the shoe for vertical movement on the frame 63, a bell-crank lever 64k pivoted or fulcrumed in said frame, a connecting rod 64l adapted to be adjustably pivoted at one extremity in any one of a plurality of holes formed in said bell crank lever and at its opposite extremity adjustably secured by nuts 64m on a pitman 64n, and cam-contacting arms 64o and 64p which are also adjustably secured on the pitman 64n by nuts 64q and 64r. These arms 64o and 64p are alternately raised and lowered by separate cams, now shown, which are adjustably mounted on the shaft 62e. The frame 63 is formed with guide brackets 64t for the pitman 64n.

To vary the speed of rotation of the chuck during reciprocation thereof, the splined friction gear 64h is provided with a grooved hub 64h', also splined on shaft 64i, and a grooved cam 64h2 is adjustably secured on shaft 62e, motion being transmitted from the came to said gear by a lever 64h3, which is adjustably pivotally supported at its upper extremity on a bracket extension 63e of the frame 63, said lever extending downwardly and adjacent cam 64h2 being provided with a pin 64h4 working in the groove of said cam, and at its lower extremity said lever connects with the grooved hub 64h' by a link 64h5 and pin 64h6 working in the groove of said hub.

In operation, the chuck-reciprocating cam 62d and brake cams being adjusted to work in synchronism, when the chuck spindle and chuck elevate, the brake 64j is released, permitting spindle 64 to lower and thus lowering gear 64g into contact with the continuously rotating gear 64h and imparting rotation to the chuck; and when the chuck is lowered, brake 64j is raised and thus contacts with gear 64g and raises the spindle 64, thereby moving gears 64g and 64h out of contact and stopping rotation of the chuck.

To gradually accelerate and decelerate or vary the speed of rotation of the chuck during reciprocation thereof, the drum cam 64h2 and lever 64h3 may be used to move the gear 64h relatively to gear 64g. Ordinarily, however, the brake, if properly adjusted, will operate to effect gradual contact and release of the gears 64g and 64h and provide for smooth operation of the chuck 62.

In Figure 3 the chuck is adapted to be rotated through the medium of a segmental gear 65 formed integral with a lever 65a, which is actuated by a cam 65b, adjustably secured on shaft 64j, against the tension of a retracting spring 65c, the lever being adjustably pivoted in the frame 63, the segment 65 meshing with a pinion 65d adjustably secured on the spindle 64. The cam 65b is shown as being of symmetric contour but may be replaced by a cam contoured in accordance with the work involved, it being obvious that an irregular cam would impart intermittent rotation to the chuck, and the cam 62d may also be given an irregular contour to give the chuck a number of minor reciprocations. This form of chuck rotating means is of particular advantage where it is desired to synchronize the rotary time and motion of the chuck with cooperating fabricating units, and is used, for instance, when the chuck is to be rotated in reverse directions as in closing the partible undercut ware molds 59, as by adjusting the throw of lever 65a and/or substitution of a suitably contoured cam, the chuck 62 may be caused to rise and contact with and lower and release the molds in predetermined angular positions, and also impart a definite number of revolutions to the mold when elevating the latter clear of its tray. This chuck-rotating assembly may be applied at any point along the fabricating line in place of that illustrated in Figure 1, as the frames 63 are constructed to provide for interchangeability of parts.

Figures 33, 34:
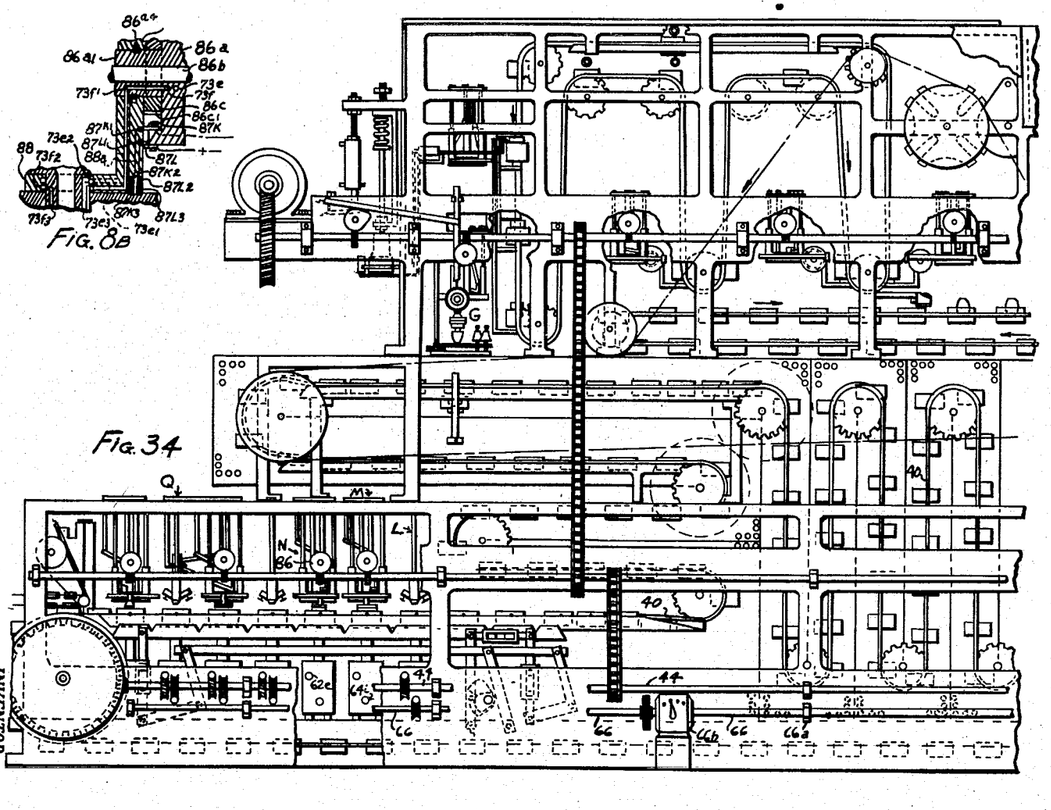
Figure 33 is a view in elevation of the cams for the carriage of Figure 25.
Figure 34 is a side elevation of a ware making machine showing the apparatus hereof incorporated therein.

The shaft 64i, on which the continuously-driven gears 64h are splined, and the cam shafts 62e are arranged so that they may be driven from the main drive shaft 44, or, as shown in Figure 34, the shafts 64i may be driven from an independently-driven shaft 66 and the shafts 62e from shaft 44, note Figure 34 and the reduced view, Figure 7, the drive being transmitted by helical gears 67 and 67a, the gears 67 being adjustably secured on the shafts 66 and 44 and the gears 67a on the cross shafts 62e and 64i. The speed of rotation of shafts 62e and 64i may be independently varied along the fabricating line by simply changing the ratio of gears 67 and 67a. These latter gears are used at various points in the entire apparatus, as will be noted in Figure 34.

The shaft 66 is supported in bearing brackets 66a, which project at intervals from the main frame of the machine, said shaft being driven by a motor 66b, see Figure 34.

Super and sub-atmospheric pressure and other mediums may be applied to the molds through the chuck for various fabricating operations, the passages 62a and 62b extending down into the chuck spindle 62c as shown and opening out into annular registering air grooves 62a' and 62b' formed in a hood 70 having a working fit around said spindle and adjustably supported on the frame 63 by a thread rod 70a, hose nipples 62a2 and 62b2 being threaded into the hood 70 and communicating with said grooves. A further communicating passage opening out in the bottom of the chuck is provided by a bore 71 in the screw 62c', the interior of the spindle 62c being hollow, thus forming a chamber 71a, and the hood 70 having a further groove 71b in communication with said chamber, a hose nipple 71c being threaded into the hood 70 and communicating with said groove. Where the passages 62a, 62b and 71 open out into the chuck 62, resilient sealing and cushioning pads 62l are adjustably threaded into said chuck.

Figures 8, 8A, 9, 10, 24:
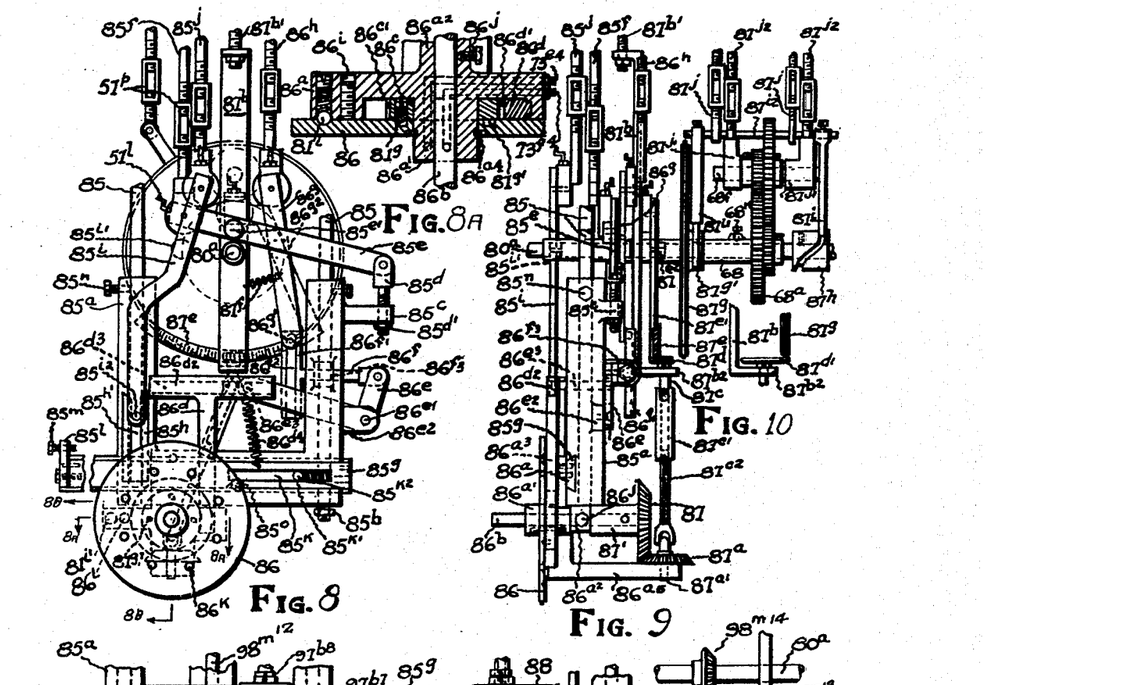
Figure 8 is a view in front elevation of a tool or attachment carriage assembly to which various fragmentary tools and attachments are applied.
Figure 8A is an enlarged sectional view taken on the line 8A—8A of Figure 8.
Figure 9 is a view of the apparatus of Figure 8 in side elevation.
Figure 10 is a detail fragmentary view of parts of the assembly.
Figure 24 is a side elevation thereof partly in section.

Many of the fabricating tools and attachments are mounted on a standard form of carriage assembly substantially similar to that illustrated in Figures 8 and 8A, for the purpose of giving them the desired movements relatively to the ware on which they are to perform.

The reference numeral 85 designates vertical guide and stop posts which are adjustably secured in and depend from one of the top plates 38c of the machine, a frame 85a shown as of rectangular shape being mounted to have a vertical sliding fit on said posts, nuts 85b being threaded on the lower extremities of said posts to adjustably limit the lowermost point of travel of said frame. The frame 85a is formed with a bracket 85c, which is bored to receive a pivot bolt 85d, which is adjustably secured by nut 85d', a lever 85e being pivoted at one extremity in said bolt and at its opposite extremity adjustably and pivotally supported from a post 85f, which also depends from and is secured in the top plate 38c. This lever 85e is provided with a cam roller 85e' adapted for contact with various types of frame-actuating cams shaped in accordance with the work involved and which are mounted on one of the cross shafts 80a, or if the variable speed assembly is used, on the sleeve 68, these cams being shown in connection with the various attachments hereinafter described.

The lower portion of the frame 85a is formed with a dove-tail slot or groove in which a bar 85g is mounted to have a horizontal sliding fit, the bar at the left as viewed in Figure 8 being formed with a vertical guide bracket 85h having a central slot or track 85h'. A lever 85i provided with a cam roller 85i' is pivotally and adjustably supported at its upper extremity from a post 85j, and at its lower extremity said lever is provided with a pin 85i2 adapted to have a working fit in said track 85h'. As in the case of lever 85e, the cams for the lever 85i are given the required contour in accordance with the work involved and are mounted on one of the cross shafts 80a or sleeve 68, each attachment generally requiring a particular contoured cam which is illustrated in connection with the attachment.

The bar 85g is slotted at 85k, a pin 85k' being secured in the frame 85a, a compression spring 85k2 being mounted to abut at opposite ends, respectively, against said pin and the bar 85g. The bar 85g is also provided with a screw bracket 85l in which a contact screw 85m is mounted, which serves to adjustably limit the movement of bar 85g in one direction independently of its cam travel or reverse movement. The screw bracket 85l is adapted to be attached at either end of bar 85g and the spring 85k2 at either end of slot 85k, to conform to the positive direction of movement of the cam lever 85i.

It will be seen that when levers 85e and 85i are oscillated, the frame 85a, reciprocates vertically and the bar 85g laterally, the bar deriving its vertical movement from said frame. The frame is provided with screws 85n and 85o adapted to be adjusted in contact with the posts 85 and frame 85a in the event the actuating cams are to be disconnected and the frame and bar set in rigid adjusted position.

An attachment and tool-mounting turret disk 86 is supported from the slide bar 85g by means of a hanger bracket 86a, said bracket being formed with projecting hub portions 86a' and 86a2, see Figure 8A and is secured to the bar 85g by screws 86a3, see Figure 9, the disk 86 being rotatably mounted on the hub 86a' and prevented from lateral displacement by a ring 86a4. A shaft 86b extends through and has bearing in the projecting hubs of bracket 86a, this shaft functioning in a manner which will later become apparent. The disk, like the feeder turret 81d, may be rotated intermittently in one direction or oscillated, the detents 81g and 81i being housed, respectively, in a gear 86c and the bracket 86a and adapted to register in detent or latch notches 81g' and spotting notches 81i' formed in one side of said disk 86, there being four of each of said notches in the present instance. The gear 86c is mounted to rotate free on the bracket hub 86a' and the teeth 86c' of said gear are in continual mesh with the teeth 86d' of a rack 86d, the latter being slidably dove-tailed into a groove formed in the bracket 86a, see Figure 8A, and terminating in a T-head 86d2, see Figure 9, which is formed with a track 86d3. The rack 86d is actuated by a bell-crank lever 86e, which is fulcrummed at 86e' on a bracket extension 86e2 formed on the frame 85a, the one extremity of said lever 86e being provided with a pin 86e3 which has a sliding fit in the groove or track 86d3, while the opposite extremity of said lever has pivoted thereto a connecting rod 86f which extends through a guide bracket 86f3 and terminates in a T-head 86f' formed with a groove or track 86f2, said T-head cooperating with a lever 86g pivotally supported at its upper extremity from a post 86h, which is secured in one of the top frame plates 38c, and at its lower extremity said lever is provided with a pin 86g' having a sliding in the groove or track 86f2 of T-head 86f'. Lever 86g is provided with a cam roller 86g2 adapted to contact with a suitably shaped cam to be mounted on shaft 80a, these cams also being generally shown with the respective attachments hereinafter described. A retracting spring 86d4 is secured at opposite extremities, respectively, to the T-head 86d2 and the bar 85g.

A screw 86i is shown as threaded in the bracket 86a, see Figure 8A, this screw being adjusted against the turret disk 86 when it is desired to maintain said disk stationary with said bracket.

A screw 86j is also shown threaded in the hub 86a2 of bracket 86a, and this screw may be adjusted against the shaft 86b when it is desired to maintain the latter stationary with said bracket.

The disk 86 is provided with a plurality of holes 86k for attaching various fabricating tools and attachments, such as shaping tools, turning and finishing tools and transfer chucks, which will be described in connection with each respective fabricating operation.

The shaft 86b may be driven by either a positive or friction drive, both forms of drive being shown in Figures 9 and 10 for the purposes of illustration.

A bevel gear 87, formed with a hub 87' is shown as adjustably secured on the shaft 86b, this gear meshing with a similar gear 87a secured on a stub shaft 87a' which has bearing in the projecting extremity of a bracket arm 86a5 formed as part of the bracket 86a. A bracket 87b is adjustably supported by a post 87b' from one of the top frame plates 38c and extends down and at its lower extremity is formed with a foot 87b2, a stub shaft 87c having bearing in said foot, this shaft forming part of a flexible coupling comprising a sleeve 87c' and longitudinally grooved shaft 87c2 in spline-sliding engagement with said sleeve, the lower extremity of shaft 87c2 being coupled for universal movement with the stub shaft 87a' on which gear 87a is secured. The stub shaft 87c of the flexible coupling has adjustably secured thereon a pinion gear 87d, which may be replaced by a friction gear 87d', see Figure 10, when a non-positive, intermittent or continuous high-speed drive is desired. If pinion 87d is used, the drive is effected by means of a segmental gear 87e formed on a lever 87e', which is adjustably pivotally mounted on the bracket 87b and provided with a cam roller 87e2 adapted to contact with a cam to be mounted on shaft 80a or sleeve 68 and which may be given various contours in accordance with the rotation desired for shaft 86b. The lever 87e' may be retracted by a spring 87f.

If the friction or non-positive drive is desired, the friction gear 87d' may be substituted for pinion 87d and a cooperating friction gear 87g splined or mounted for longitudinal sliding movement on shaft 80a or sleeve 68, the latter gear being formed with a hub having an annular groove 87g' formed therein. A grooved cam 87h, adjustably mounted on shaft 80a, transmits longitudinal sliding movement to friction gear 87g by means of a pin 87i, slide rod 87i2 and pin 87i, the pins 87i and 87i' being adjustably secured on slide rod 87i2 which in turn is mounted to slide longitudinally in adjustable supporting brackets 87j which extend upwardly and are secured in one of the frame plates 38c.

If the rotation of shaft 86b is to be alternately reversed, the drum cam 87h may be used, this cam movement causing the friction gear 87g to move across the face of gear 87d', and when the gear 87g passes over the vertical axis of gear 87d', the rotation of said gear will be halted and then reversed, thus reversing the drive on said shaft 86b.

The jack shaft 68f of the change-speed assembly is shown as mounted and having gearing in hanger brackets 87j' which are also adjustably supported by posts 87j2 from one of the frame plates 38c.

Some of the fabricating attachments are shown mounted directly on the turret disk 86 while others are shown mounted on a turret 88, see Figure 24, which is secured to the disk 86 by screws 88a. This turret may be rotated in accordance with the particular attachments in use. If there are four attachments on the turret and all are being used in succession, the lever 86g may be actuated by a cam.

Super and sub-atmosphere, electricity and other fluid mediums may be communicated to the various fabricating attachments that may be applied to the turret disk 86, see Figures 8A and 34.

For super and sub-atmosphere, liquids and analogous fluids, the bracket 86 is bored to provide passages or ducts 73e and 73f, which lead through the hub 86a' and register with passages 73e' and 73f' formed in the turret 88, these latter passages terminating in annular grooves or chambers 73e2 and 73f2. The fragment of the turret 88 shown in Figure 8B is provided with a rotating spindle or post which is formed with passages 73e3 and 73f3 which register at one extremity with said chambers and at their opposite extremities terminate at the point of application. Hose nipples 73e4 and 73f4 are secured in the bracket 86a, see Figure 8A for connection of the air or fluid lines leading to the control valves 72.

To supply the various attachments that may be applied to the turret 88 or disk 86 with electric current, the bracket arm 86a5 may be formed with a projection on which are secured brushes 87k and 87l, Figure 8b, which are adapted to contact with suitably insulated commutator rings 87k' and 87l' secured in the adjacent side of the disk 86, said rings being connected with another set of commutator rings 87k2 and 87l2 secured on the periphery of said disk and which in turn transmit the current to the attachment through contacts or rings 87k3 and 87l3 secured in the attachment, a fragment of the latter being shown in Figure 8B.

With reference to the diagrammatic illustration in Figure 34, at the left of the drier the cups, which may have then reached a partially dry or leather hard condition, are shown as being transferred from the forming molds in the main drier to the upper treating chamber and turned and finished during the process of transfer. However, means are provided for transferring any particular shaped article of ware, the chucks for gripping the ware being preferably mounted on one of the turrets 88, and are generally designated by the reference numeral 97, see for example, Figures 23 and 24. These ware-gripping chucks are so constructed that ware which may be in a leather-hard state as well as delicate and fragile ware may be transferred without distortion, marring or breakage, said chucks being shown in detail in Figures 11 to 14 inclusive.

Figures 12, 16, 25, 26, 33:
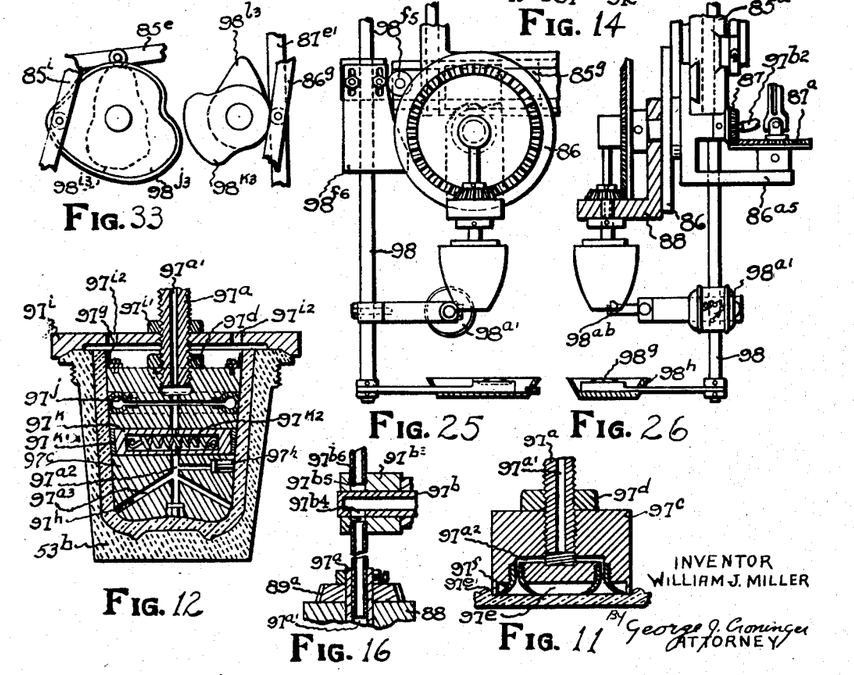

The transfer movements of the chucks 97 are governed by the carriage assembly illustrated in Figures 8 and 9, the method of mounting said chucks on the turret 88 being shown in Figures 23 and 24. Each chuck is preferably provided with a stem 97a and operates to grip the ware through the medium of sub- and/or super-atmosphere, which may be conducted to the chuck by means of the spider attachment shown in detail in Figure 16. The shaft 86b, Figures 8 and 9, is formed with a longitudinal bore in which a tube 87b, Figure 16, is inserted, the one extremity of said tube being provided with a hose nipple 97b2, see Figures 24 and 26, and at its opposite extremity said tube projects through the shaft 86b. This tube has a free fit in said bore, as the shaft 86b rotates independently thereof, and the spider is formed with a hub 97b3 which is rotatably mounted on the projecting extremity of said tube, see Figure 16. The tube 97b is closed or formed solid at its one extremity and provided with a port 97b4, and the hub 97b3 is formed with a plurality (four in the present instance) of radial bores 97b5 in which tubular arms 97b6 are secured, said bores being adapted to register with the port 97b4 as the spider rotates on the tube 97b. The chuck stems 97a are also formed with longitudinal bores 97a' and the tubular arms 97b6 telescope and have a rotatable working fit therein, said stems extending through and being in longitudinal spline-sliding engagement with the gears 89a which are in mesh with the ring gear 89, previously described. Collars 97b7 and 97b8, see Figure 23, are adjustably secured on the chuck stems 97a, by means of which the stems may have an adjustably limited range of longitudinal sliding movement in the gears 89a or be held longitudinally rigid therewith.

Figure 11 illustrates a transfer chuck adapted to grip the ware from the bottom, said chuck comprising a body block 97c, which is interiorly bored and threaded to receive the stem 97a, the block 97c being adjustably secured on said stem by a nut 97d. The bottom surface of the block is recessed or formed with an annular cavity 97e, the resulting flange being shaped to center on the bottom bead of the ware as at 97e', a plurality of vacuum cups or nipples 97f being adjustably threaded in the block 97c, the cups preferably being three in number and spaced angularly, said block being formed with conduits or passages 97a2 which establish communication between the bore 97a' in stem 97a and the vacuum cups of nipples 97f.

It will be noted that this form of chuck leaves the greater surface portion of the ware free for turning and finishing operations, an advantage which will later become more apparent, and further, that the angular spacing of the nipples 97f provides a three point ware surface contact which will always be equal at all points regardless of whether the gripping surface of the ware is of regular or irregular contour.

The chuck illustrated in Figure 12 is particularly adapted for gripping the interior of deep ware and may be operated by either sub or super atmosphere. Simply for the purposes of illustration, parts are shown in this chuck which would render the chuck operative, if used alone, or in other words, a number of modifications in structure are included in the same figure to conserve space.

The block 97c in this instance has secured on the top surface thereof an annular flexible sealing valve 97g, which functions to seal the space between the chuck and ware when sub-atmosphere is used as the gripping medium. The passage 97a2 in this instance branches off at various points as at 97a3, and where these passages terminate, cushioning plugs 97h, which may be of soft rubber, are adjustably secured therein to ensure against marring and distortion of the ware during transfer and a number of these plugs may be solid to selectively close said passages. A guard or stop member 97i, which centers on and contacts with the mold is adjustably secured on the stem 97a, by a nut 97i, to adjustably limit the approach of the grip head to the ware, said guard being vented at 97i2.

The block 97c in shown as being formed with an annular recess to receive a flexible or expansible tube 97j (which may be in the form of a series of bulbs), formed with a nipple portion which fits in the passages 97a3. This tube may function as the gripping means through the application of air under pressure and also serve as a further centering and cushioning means for the chuck relatively to the ware. It will be seen that the expanding force will be applied equally in all directions by adopting this construction.

A further method of providing a grip means is to form a series of radial bores, preferably three, in the block 97c, which meet or converge at the central passage 97a2, gripping pistons 97k being mounted to have a sliding fit in said bores, cushioning pads 97k' being secured on the ends of said pistons. These pistons may be expanded by air under pressure or super atmosphere and retracted by sub-atmospheric pressure or by springs 97k2, the latter being housed in said pistons and secured at one extremity thereto. The abutting end of each piston may be formed with a bore segment, thus providing a complete bore which registers with the passage 97a2.

It will also be apparent that in this type of grip means the expanding force is applied equally in all directions.

Figures 13, 14, 15, 27, 28, 29:
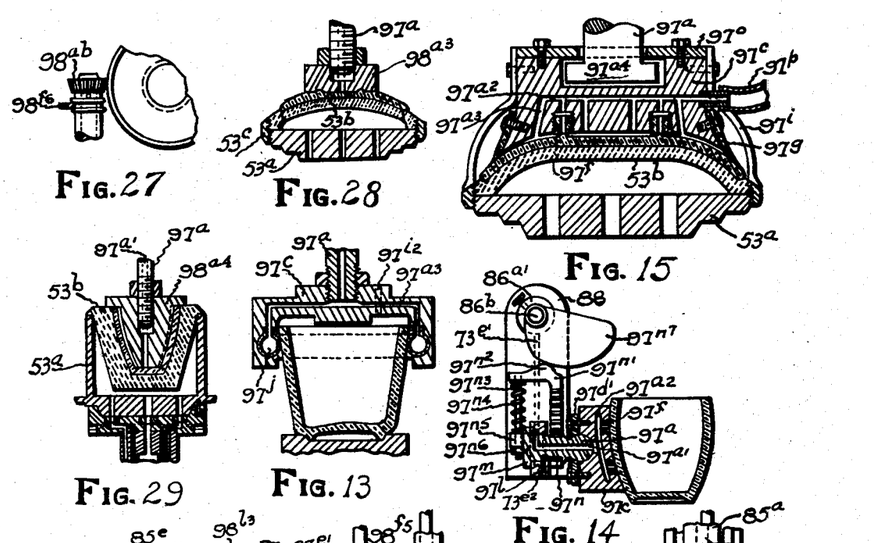

Figure 13 illustrates a chuck adapted to grip the exterior of deep ware, the expansible tube 97j being utilized as the grip member as in Figure 12. It will be noted that the block 97c is vented at 97i2 to prevent entrapping of air in the chamber formed when the chuck grips the ware.

The chuck illustrated in Figure 14 is adapted to grip the ware from the side and turn or invert the ware and which permits access to the interior as well as the greater portion of the exterior of the ware.

The assembly is preferably mounted on the turret 88, the stem 97a in this instance being formed with an enlarged rounded head and the body block 97c is socketed and clamped on said head by means of adjustable pressure plates 97d'. The stem for this type of chuck serves as a bearing block or bracket 97l shown in section, which may be formed on the turret 88, said stem being formed with an annular end flange 97m, to prevent lateral displacement toward the right as viewed in Figure 14.

At an intermediate point, the stem or shaft 97a is formed with a pinion 97n adapted to mesh with a depressible rack 97n', which is formed with a cam-contact hump 97n2 and a pin or leg 97n3, the latter being encircled by a spring 97n4 and having a sliding fit in a bracket 97n5, a nut 97n6, which is threaded on the one extremity of said leg 97n3, serving to adjustably limit the travel of the rack 97n' in one direction. A cam 97n7 is shown as adjustably secured on the shaft 86b for depressing rack 97n'.

Sub- and/or super-atmosphere may be applied through either one or both of the passages 73e-e'-e2 or 73f-f'-f2, see Figures 8A and 8B.

In operation, cam 97n7 depresses rack 97n' in mesh with pinion 97n, turning stem or shaft 97a and the chuck secured thereon, and this turning operation may be initiated at any desired point of the transfer operation by adjusting the actuating cam for lever 87e', Figures 8A and 8B, which is not shown but may be shaped substantially similar to the cam 97n7 to permit change of phase while in operation, or by adjusting cam 97n7 on shaft 86b. It will thus be apparent that the position of the chuck may be changed to conform to the points of pick-up and deposit of the ware while moving from one point to the other.

Figure 15 illustrates a modified form of chuck for shallow ware, the guard 97i in this instance being secured to the block 97c and the stem 97a being formed with a flanged or enlarged head 97a4 which has a loose mounting in a recessed portion of said block, a plate 97o being secured on the upper surface of the block, thus providing a floating mounting for the chuck on its stem which may prove advantageous in some forms of ware transfer work. The operating medium may be applied through a flexible hose connection 97p, which may connect direct with control valves, or be attached at any convenient point in the system. The nipples 97f are, as usual, spaced angularly to provide a three-point, automatically equalizing, contact with the gripping surface of the ware.

As the transfer movements of the chucks are governed by the carriage assembly illustrated in Figures 8 and 9, wherein, the throw of the various levers may be adjusted while in operation, the path of transfer of the chucks may be defined or regulated while they are moving in said path, so that the chucks may be accurately guided and positioned at all times, and the phase of motion of the chucks may be accurately regulated during the transfer operations, and this facility of control of the chucks is of particular advantage in the automatic turning and finishing of the ware, which will now be described.

Ware may be taken from and deposited on a continuously-moving conveyor or other support by timing the movement of the slide bar 85g so that it will travel with the moving ware conveyor or support while the chuck is operating to grip and release the ware.

In the apparatus as arranged in Figure 34, the turning and finishing assembly is mounted to operate on the ware as it is being transferred from the lower main drier to the upper treating chamber in a manner to be described, but it will be understood that the turning and finishing assemblies may be mounted in cooperative relationship with the carriage assembly carrying the transfer chucks at any point along the fabricating line where desired.

Figures 17, 19, 20, 21, 22, 30:
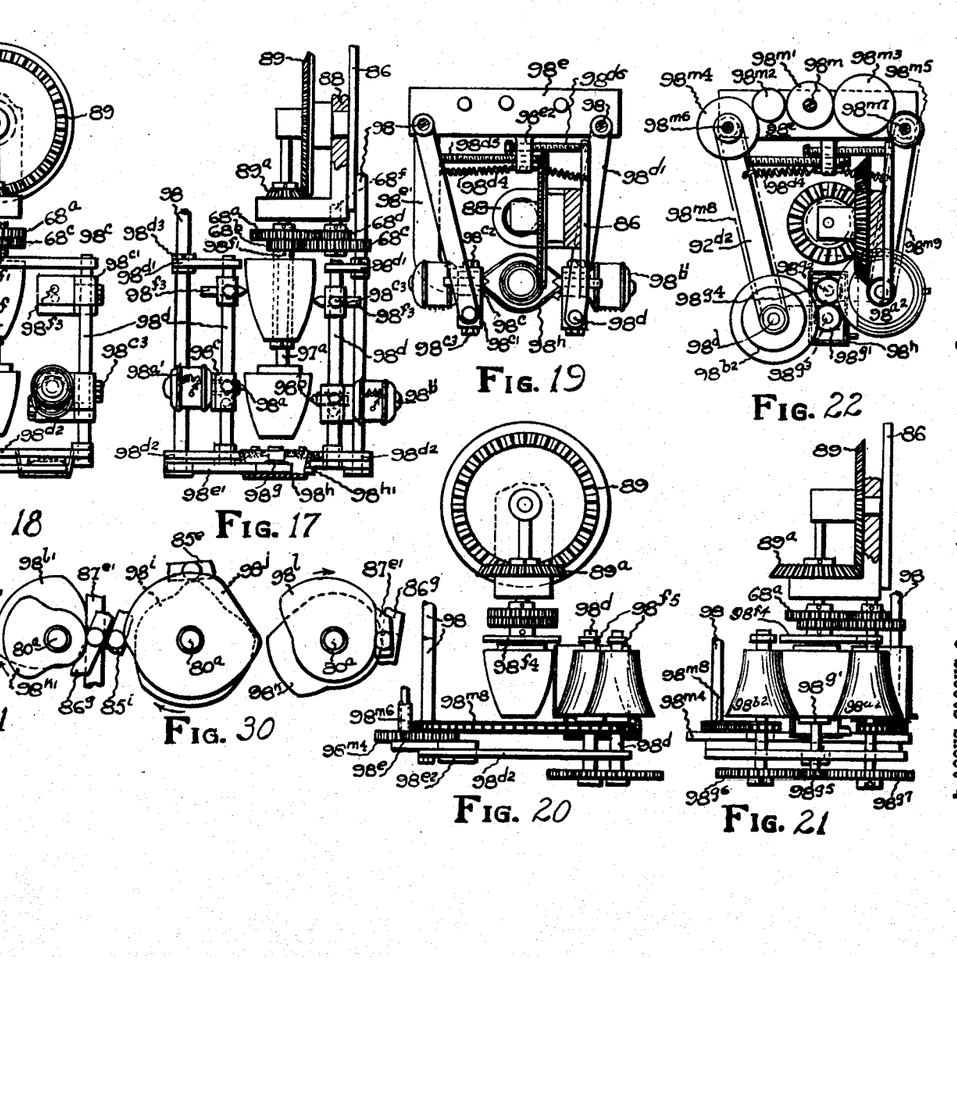

Referring to Figures 17, 18, 19, the assembly is adapted to be adjustably supported from any of the frame plates 38c by posts 98. The tools used in the turning and finishing operations are of different types in accordance with work involved, the cutting tool in Figure 17 being indicated at 98a and the burnishing and finishing tool at 98b, each of said tools as here shown being adjustably secured in the armature shaft of a motor 98a' and 98b' and independently driven, the motors being supported by blocks 98c, which are adjustably secured to a bracket 98c' by a screw 98c2, said bracket in turn being adjustably secured to supporting posts or shafts 98d by a screw 98c3, see Figure 19. By loosening screw 98c2, block 98c may be adjusted angularly relatively to bracket 98c', thereby adjusting the tool, and by loosening screws 98c3 the bracket 98c' may be adjusted angularly relatively to posts 98d and also vertically on said posts, thereby similarly adjusting the tool. It will thus be seen that each tool is universally adjustable so that the tools may work at varying angles relatively to the ware.

The posts 98d are secured in upper and lower arms 98d' and 98d2 which are mounted to occillate or yield in a horizontal plane in bearing collars 98d3, the latter being adjustably secured on the main supporting posts 98.

A bracket 98e is secured on the lower ends of the posts 98, see Figure 19, said bracket being formed with an extension 98e' and a lug or ear 98e2, retraction springs 98d4 being secured at opposite extremities, respectively, to said lug and the lower arms, which move outwardly against the tension of said springs, and to adjustably limit the inward movement or approach of said arms toward one another, abutment screws 98d5 and 96d6 are threaded through said lug 98e2 and may be adjusted relatively to said arms.

The tools 98a and 98b are accurately guided by a pattern cam 98f, which is mounted on the transfer chuck stem 97a and may be secured thereto by screw 98f' and rotate with the chuck and ware, or rotated free on said stem at varying speeds relatively to the chuck and ware, the hub on the cam 98f being adapted to receive change speed gear 68b, gear 68a being secured on stem 97a and the jack shaft 68f for gears 68c and 68d having bearing in the turret 88. A bearing collar 98f is removably and adjustably secured on stem 97a below cam 98f for supporting the cam when loosened for free rotation on said stem.

Tracers 98f3 are mounted for universal adjustment similar to the motor and tool assembly above described on the posts 98d, these tracers being adapted to follow the contour and design or pattern on cam 98f as the latter rotates, and as the tracers are mounted rigidly relatively to the tools 98a and 98b, this motion will be translated to said tools.

The bracket extension 98e' has mounted thereon a bottom turning and finishing tool 98g which is centered relatively to the axis of the transfer chuck when the latter is in operative position between the tools and tracers, so that the rotating ware may be lowered onto this tool at the beginning or completion of the turning and finishing operation, in this instance, at the beginning of the work.

A chip and dust receiving housing 98h is also mounted on the extension around and beneath the bottom tool 98g, the dust particles and chips resulting from the turning and finishing operations falling therein and are preferably removed therefrom by suction, a hose nipple 98h' being attached to said housing for the vacuum hose.

Figure 30 illustrates a set of cams that may be used with the carriage assembly, Figures 8 and 9 when turning and finishing ware with the pattern cam 98f and cooperating tracer and tool assembly. These cams are preferably mounted as in one of the cross shafts 80a, so that the phase of motion of the parts primarily actuated by said cams may be under ready control while in operation and while the driving connection subsists.

The cam for lever 85e or the vertical motion lever is designated 98i, the cam for lever 85i, or the slide bar lever, which carries the turret 88 and transfer chuck together with the pattern cam 98f and various gears and appurtenant parts is designated 98j, the cam for lever 87g or the lever which turns the turret after each turning and finishing operation is designated at 98k, and the cam for segment lever 87e' which drives shaft 86b and rotates the pattern cam and transfer chuck with the ware thereon is designated 98l.

In the position shown in Figures 17, 18 and 19, the ware is moving in toward the tools, which will be moved further apart to initially clear the ware by the pattern cam moving therebetween. When the ware shall have reached an intermediate position between the tools, segment 87e will be actuated by cam 98l and the ware rotated, lever 85e lowering and rotating ware onto the bottom tool 98g, dwelling a short period, at which time the side tools 98a and 98b are out of contact with the ware. Cam 98i then raises lever 85e and the rotating ware moves upwardly and the tools 98a and 98b, which are guided by tracers 98f3, move into contact with the vertically moving rotating ware to perform their respective functions, after which the turret is given a partial turn to deposit the ware in a handle mold as illustrated in Figure 34 and bring another chuck and pattern cam into operative position, or the same chuck may be oscillated back to repeat the operation, depending upon the position of the latch 81g in the disk 86, Figure 8A.

It will be obvious, however, that the ware may be deposited at any desired point and that one or a multiple of pattern cams and transfer chucks may be mounted on the turrent 88.

Figures 20, 21 and 22 illustrate a turning and finishing assembly particularly adapted for plain ware or ware having a regular surface contour. In this instance, the turning and finishing tools are designated at 98a2 and 98b2 and are primarily driven from a vertical shaft 98m, see Figure 22 which has bearing in the bracket 98e, and may be driven from any suitable source, as for instance, one of the shafts 80a, the drive being transmitted to the posts or shafts 98d on which the tools are secured by means of a gear 98m', which is secured on shaft 98m, idler gears 98m2 and 98m3 which transmit the drive to gears 98m4 and 98m5, these latter gears being secured on vertical shafts 98m6 and 98m7, also having bearing in bracket 98e. The posts or shafts 98d in this instance are mounted to rotate and extend through and have bearing in the lower arms 98d2, and the posts or shafts 98d and the shafts 98m6 and 98m7 are provided with sprocket gears and connected by sprocket chains 98m8 and 98m9 or analogous positive flexible drive connection.

In addition to the bottom tool 98g shown in Figure 17, a bottom burnisher 98g' is provided in this instance, said tools being secured on jack shafts 98g2 and 98g3 which extend through and have bearing in a bracket extension of the arms 98d2, the lower extremity of each shaft having secured thereon gears 98g4 and 98g5 which are adapted to mesh, the drive being applied to gear 98g5 by means of gears 98g6 and 98g7 which are secured on the posts or shafts 98d, see Figure 21.

The pattern cam in this instance is in the form of a profile disk 98f4, each shaft 98d having rotatably mounted thereon rollers 98f5 adapted to follow the contour of the profile disk 98f4 during the turning and finishing or burnishing operations.

Figure 31 illustrates the cams for the carriage assembly, Figures 8 and 9 which are indicated by 98i', 98j', 98k' and 98l'.

It will be noted from the contour of these cams that the ware first moves adjacent the tool 92a2 and over the bottom tool 98g, is then lowered and dwells, both the ware and tools being rotated, the ware then elevating slightly to clear the tools and moving over adjacent tool 98b2 and over bottom tool 98g' and again lowers and dwells for the burnishing operation, after which the frame 85 is raised and the slide bar 85g retracted and the ware clears the burnishing tools and the turret 88 is given a partial turn as described in connection with Figures 17, 18 and 19.

This assembly is shown in operation in the apparatus at G.

Figures 23 and 24 illustrate an assembly particularly adapted for swabbing and edge-finishing ware. This assembly is shown as mounted at the lower left extremity of Figure 34 to operate on the ware as it leaves the drier, the ware being transferred from the molds carried by the chucks 62 to a ware conveyor, which is driven in synchronism with the conveyer 40 as will hereinafter be described, the ware being finished and swabbed while undergoing transfer.

Referring to Figures 23 and 24, it will be noted that the transfer chuck in the position shown is about to rotate a plate in contact with an edge-finishing tool, above and below and slightly to one side of which are mounted swabbing pads. This swabbing and edge finishing assembly is supported from one of the top frame plates 38c by an angle-bracket 98m10, which in turn has secured thereto an angle bracket 98m11, the latter serving to support and stabilize the upper extremity of a vertical shaft 98m12, which is driven by means of bevel gears 98m13 and 98m14, respectively secured on the shafts 98m12 and 80a. The lower extremity of shaft 98m12 extends through the bracket 98m10 and has adjustably secured thereon a motion plate 98m15, which coacts with a Geneva gear 98m16 secured on a counter shaft 98m17, which extends through and has bearing in the bracket 98m10.

A turret head or bracket 98n is secured on the counter shaft 98m17, and to this bracket a plurality of swabbing members and edge finishing tools are adjustably secured, the members which are visible in Figures 23 and 24 being indicated at 98n', 98n'', 98n2, and 98n3, and the tools at 98n4, 98n5 and 98n6.

Each swabbing member is formed with ducts and faced with felt, sponge, or analogous absorbent material which is supplied with a suitable fluid from a chamber 98o formed in each member, the fluid being supplied to said chambers through ducts 98o', which are formed in the shaft 98m17, and have connected thereto hose nipples for attachment of hose or analogous members 98o2 which connect with valved hose nipples 98o3 secured in the pad members 98n'—n3, the shaft 98m17 being broken at an intermediate point to show said ducts, see Figure 24. At the upper extremity of shaft 98m17, the ducts 98o' terminate in annular chambers in a manner similar to the ducts 73e3 and 73f3, Figure 8B, said ducts 98o' being supplied with the required fluid through hose or analogous flexible members 98o4, which preferably lead to the control valves and then to a source of supply.

Figure 32:
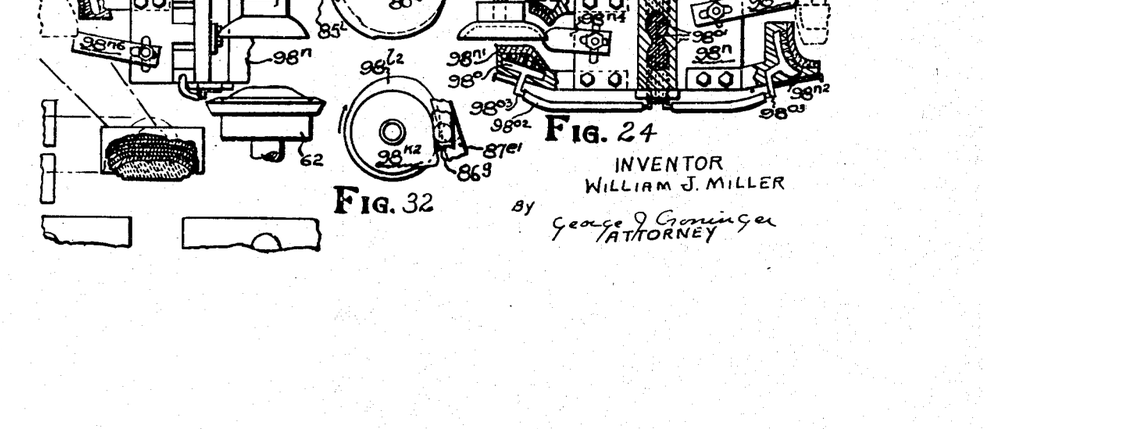
Figure 32 is a view in elevation of the cams for the carriage of Figure 23.

Figure 32 illustrates a set of cams for use with the carriage assembly, Figures 8 and 9, when the transfer chucks are operating to bring the ware into operative adjacency to the swabbing and edge finishing assembly first described.

The vertical frame cam for lever 85e is designated by 98i2, the horizontal slide-bar cam for lever 85i by 98j2, the turret cam for lever 96g by 98k2 and segment cam for lever 87e' by 98l2.

In the position shown in Figures 23 and 24, the plate has been gripped and raised from one of the chucks 62 and is just beginning its movement past and in contact with the edge-finishing tool 98n4, see Figure 24, the ware moving toward the left as viewed in Figure 23 and away from the observer as viewed in Figure 24. Cam 98l2 is about to actuate segment lever 87e' and rotate the ware when in contact with said tool. After the ware has been rotated in contact with tool 98n4, it moves farther away from the left, or toward the observer in Figure 24, and is lowered in contact with the swabbing pad 98n' while still rotating, see contour of cams 98i2 and 98l2, and then elevated into contact with swabbing pad 98n''. Rotation then ceases and the ware is moved again toward the left and lowered onto a ware conveyor, the plates in this instance, being stacked on said conveyor, which is intermittently driven in synchronism with the transfer operation, the plate chuck stem 97a being in spline-sliding engagement with gear 89a and telescoped over the tubular arms 97b6 to permit this stacking operation.

The chuck then elevates and moves back and cam 98k2 acts on lever 86g to partially rotate turret 88 and bring another transfer chuck into position, and during which time the motion plate 98m15 may act on the Geneva gear 98m16 to partially rotate turret bracket 98n to bring the succeeding edge-finishing and swabbing assembly into position. However, it will be understood that when swabbing and edge-finishing a line of plates or ware suitable for one form of transfer chuck and swabbing and finishing assembly, the turret cam 98k2 and motion plate 98m15 may remain idle.

Figures 25 and 26 illustrate a modified form of turning and finishing tool and pattern cam, the cam being designated by 98f6 and the tool by 98ab, the latter being independently driven by one of the motors 98a', the motor and tool assembly being adjustably mounted as in Figure 17, but in this instance, is secured on the post 98. The pattern cam 98f6 is also adjustably secured on the post 98, only one of which is required in this instance, and has a working surface contour in accordance with the shape of the ware.

The tool is shown enlarged in Figure 27 and has a beveled cutting edge or surface which acts or turns while the ware is rotating in one direction and finishes and burnishes while the ware is rotating in the opposite direction, see contour of cams 98i3 and 98l3, Figure 23. Cam 98j3 for the horizontal slide bar has a positive action toward the right as viewed in Figure 8, being reversed in this instance. The turret cam for lever 86g is designated at 98k3. The bottom tool 98g operated substantially as in Figures 17 and 19.

In Figure 28, a tool 98a3 adapted to turn and finish the bottom of shallow ware while on the forming molds 53 is illustrated, said tool being adjustably secured on one of the transfer chuck stems 97a and is preferably mounted to operate on the ware prior to the ware turning and finishing assemblies previously described.

Figure 29 illustrates a tool 98a4 for finishing the interior of deep ware which is mounted similarly to the tool 98a3.

When using these bottom and interior finishing tools, a suction action may be set up through the chuck 62 and mold 53 to hold the ware in stable position on the mold. In Figure 29 the chip dust and other particles may be withdrawn from the ware by suction set up through the bore 98a' in the chuck stem 97a, and this course may be also adopted with the bottom tool 98a3 or the housing 98h used in conjunction therewith.

The cams for these tools need only be the usual oval-shaped cams and are not shown.

What I claim is:

1. In a pottery finishing machine, the combination of ware finishing apparatus comprising a carriage assembly provided with a turret having a plurality of transfer chucks rotatably mounted thereon, another turret mounted in adjacency to the carriage assembly and having swabbing pads and edge-finishing tools, a system of cams and levers for imparting horizontal, vertical and angular motion to the first-named turret to move the ware within operative adjacency of said pads and tools, means for reciprocating and rotating the chucks to finish the ware, and a series of supply ducts terminating in the swabbing pads for conveying a fluid medium thereto.

2. In a pottery finishing machine, of ware turning and finishing apparatus comprising a carriage assembly provided with a turret member having a plurality of transfer chucks rotatably mounted thereon, ware turning and finishing tools mounted in proximity to the carriage assembly, means for imparting horizontal, vertical and angular motion to the turret to move the ware within operative adjacency to the turning and finishing tools, and means for rotating the chucks to turn and finish the ware.

3. In a pottery finishing machine, of ware swabbing and finishing apparatus comprising a carriage assembly provided with a turret having a plurality of transfer chucks rotatably mounted thereon, another turret mounted in proximity to the carriage assembly and provided with swabbing pads and edge finishing tools, a system of cams and levers for imparting horizontal, vertical and angular motion to the first-named turret to move the ware within operative adjacency to said pads and tools, means for rotating the chucks to finish the ware, and means for rotating the second-named turret in synchronism with the transfer operations of the carriage assembly.

4. In a pottery finishing machine, a ware finishing apparatus comprising, a carriage assembly provided with a turret having a plurality of transfer chucks rotatably mounted thereon, another turret mounted in proximity to the carriage assembly having swabbing pads and edge-finishing tools, a system of cams and levers for imparting horizontal, vertical and angular motion to the first-named turret to move the ware within operative adjacency of said pads and tools, means for reciprocating and rotating the chucks to finish the ware, and means for supplying fluid medium to the pads.

5. In a pottery finishing machine, the combination of ware finishing apparatus including a carriage assembly provided with a turret having a plurality of transfer chucks rotatably mounted thereon, another turret mounted adjacent to the carriage assembly having ware swabbing and ware finishing implements mounted thereon, means for imparting rectangular and angular motion to the first-named turret to move the ware to a finishing position, means for rotating the chucks and means for conveying a fluid medium to said swabbing implement.

6. Apparatus for finishing dinnerware in the clay state comprising, a movable carriage having a turret mounted thereon, a plurality of chucks rotatably carried by the turret, a second turret adjacent the carriage having finishing tools mounted thereon, means for moving the first turret to index the chucks with a finishing station and means for moving the second turret to move the tools into and out of finishing position.

7. Apparatus for finishing dinnerware in the clay state which comprises, a turret, a plurality of radial stems thereon, a ware chuck carried by the outer end of each stem, drive means for rotating said stems, means for rotating said turret to index the chucks with a finishing station, a plurality of finishing means located adjacent said turret and means for indexing said finishing means with a finishing station.

8. Apparatus for finishing dinnerware in the clay state which comprises, a rotatable turret, a plurality of radial stems rotatably supported by the turret, a ware receiving chuck mounted on the outer end of each stem, means for rotating the turret to index the chucks with a ware finishing station, means for rotating said chucks, a support for a plurality of finishing implements adjacent said turret, and means for moving said support to index certain of the implements with certain of the chucks.

9. Apparatus for finishing dinnerware of different sizes or shapes in the dried or partly dried state which comprises, a turret, a plurality of radial stems mounted on said turret, ware receiving chucks formed for receiving a diverse production mounted on the outer ends of said stems, means for moving said turret so as to index the chucks, in succession, with a ware finishing station, a support adjacent said turret, a plurality of finishing means formed for finishing a diverse production mounted thereon and means for moving said support in timed relation with the turret to index certain of the finishing implements with certain of the chucks.

10. Apparatus for finishing dinnerware in the clay state which comprises, a rotatable turret, a plurality of radial stems rotatably supported by said turret, a ware receiving chuck mounted on the outer end of each stem, means for rotating the turret to index the chucks with a ware finishing station, means for rotating said chucks, finishing means adjacent said turret and means for raising and lowering said turret and for shifting said turret to move finished ware from the finishing position to a ware transfer position.

11. Apparatus for finishing dinnerware in the clay state which comprises, a rotatable turret, a plurality of radial stems rotatably supported by said turret, a ware receiving chuck mounted on the outer end of each stem, means for rotating the turret to index the chucks with a ware finishing means for rotating said chucks, finishing means adjacent said turret and cam actuated means for shifting the turret to move ware from the finishing position to a ware transfer position.

12. Apparatus for finishing dinnerware in the clay state which comprises, a turret having a plurality of radial stems thereon, a ware chuck carried by the outer end of each stem, means associated with each chuck for gripping the ware thereto, a drive common to all of said chucks for rotating them, means for intermittently revolving the turret and finishing means adjacent the turret formed for removing clay from the ware.

13. Apparatus for finishing dinnerware in the clay state comprising, a rotatable turret, a plurality of radially located ware receiving chucks mounted on said turret to index the chucks with a ware finishing station, a support adjacent said turret, means for turning and finishing ware mounted on said support, means for rotating the chucks, and means for receiving excess material removed during the turning and finishing operations.

14. Apparatus for finishing dinnerware in the clay state comprising, a turret, a plurality of radial stems rotatably supported by the turret, a ware receiving chuck mounted on the outer end of each stem, means for intermittently rotating the turret to index the chucks with a finishing station, continuously rotating means for driving said stems, means for temporarily connecting said continuously rotating means with said stems to rotate them, and means adjacent said turret for finishing ware carried by the chuck.

15. Apparatus for finishing dinnerware in the clay state which comprises, a rotatable turret, a plurality of rotatable chucks carried by said turret, means for rotating the turret to move the chucks into and out of a finishing station, a support adjacent the turret, were swabbing means mounted on said support, means for supplying a fluid medium to said swabbing means and means for rotating said chucks to rotate the ware in engagement with the swabbing means.

16. Apparatus for finishing dinnerware in the clay state comprising, a rotatable turret, a plurality of radially located ware receiving chucks mounted on said turret, means for gripping ware to the chucks, means for rotating the turret to index the chucks with a ware finishing station, a support adjacent said turret, means for turning and finishing ware mounted on said support, and means for rotating the chucks, said turning and finishing means including a bottom turning and finishing implement.

17. Apparatus for finishing dinnerware in the clay state which comprises, a rotatable turret, a plurality of radial stems rotatably supported by the turret, a ware receiving chuck mounted on the outer end of each stem, means for rotating the turret to index the chucks with a ware finishing station, means for rotating said chucks, a support for a plurality of finishing implements adjacent said turret, means for moving said support to index certain of the implements with certain of the chucks and means for shifting the turret from one position to another to move ware from a ware receiving position to a ware finishing position and then to a ware transfer positon.

18. Apparatus for finishing dinnerware in the clay state comprising, a rotatable turret, a plurality of chucks formed for supporting flat ware rotatably mounted on said turret, means for rotating said turret to index the chucks with a finishing station, a support adjacent said turret, flat ware finishing means mounted on said support, and means for rotating said chucks to rotate ware in engagement with said flat ware finishing means.

19. Apparatus for finishing dinnerware in the clay state comprising, a turret having a plurality of chucks rotatably mounted thereon, means for delivering ware to be finished to said chucks, means for rotating said turret to index the chucks with a finishing station and finishing means located adjacent said turret formed for removing clay from the ware.

20. Apparatus for finishing dinnerware in the clay state which comprises, a turret having a plurality of radial stems thereon, a ware chuck carried by the outer end of each stem, means associated with each chuck for gripping ware thereto, means for rotating said stems, means for rotating said turret, to index the chucks with a finishing station, and finishing means located adjacent said turret for removing clay from the ware.

21. Apparatus for finishing dinnerware in the clay state comprising, a rotatable turret, a plurality of radially located ware receiving chucks mounted on said turret, means for gripping ware to the chucks, means for rotating the turret to index the chucks with a ware finishing station, tool support means adjacent said turret, means for turning and finishing ware mounted on said support means, and means for rotating the chucks.

22. Apparatus for finishing dinnerware in the clay state which comprises, a turret, a plurality of radial stems thereon, a ware chuck carried by the outer end of each stem, means for vacuumizing said chucks so as to grip ware thereto, drive means for rotating said stems, means for rotating said turret to index the chucks with a finishing station and finishing means formed for finishing ware in the clay state located adjacent said turret.

23. Apparatus for finishing dinnerware in the clay state comprising, a turret, a plurality of radial stems rotatably supported by the turret, a ware receiving chuck mounted on the outer end of each stem, means for intermittently rotating the turret to index the chucks with a finishing station, and drive means for intermittently rotating the stems.

24. Apparatus for finishing dinnerware in the clay state which comprises, a turret, a plurality of radial stems rotatably supported by said turret, a ware receiving chuck mounted on the outer end of each stem, drive means for rotating said stems, means for rotating said turret to index the chucks with a finishing station, clutch means for intermittently connecting and disconnecting said stems with said drive, and a ware finishing implement adjacent the turret for finishing ware carried by said chucks.

25. Apparatus for finishing dinnerware in the clay state which comprises, a rotatable turret, a plurality of radial stems rotatably supported by the turret, a ware receiving chuck mounted on the outer end of each stem, means for rotating the turret to index the chucks with a ware finishing station, means for rotating said chucks, finishing means adjacent said turret and means for moving said turret to shift ware from the finishing position to a ware transfer position.

26. Apparatus for finishing dinnerware in the dried or partly dried state which comprises, a rotatable turret, a plurality of radial stems mounted on said turret, ware receiving chucks mounted on the outer end of each stem, means for moving the turret to shift the chucks from station to station, means for rotating the chucks, ware finishing means adjacent the turret at one of the stations, and means adjacent the turret at another of the stations for delivering ware to the chucks.

27. Apparatus for finishing dinnerware in the dried clay state which comprises, a rotatable turret, a plurality of radial stems mounted on said turret, ware receiving chucks mounted on the outer end of each stem, means for moving the turret to shift the chucks from station to station, means adjacent the turret at one of the stations for delivering ware to the chucks, finishing means adjacent the turret at another of the stations for removing clay from the dried ware and a ware support at another station for receiving finished ware from the chucks.

28. Apparatus for finishing dinnerware in the clay state which comprises, a rotatable turret, a plurality of radial stems supported by said turret, a cup receiving chuck mounted on the outer end of each stem, means for rotating the turret to index the chucks with a ware finishing station, means for rotating said chucks, and burnishing means adjacent the turret for burnishing cups.

29. Apparatus for finishing dinnerware in the clay state which comprises, a rotatable turret, a plurality of radial stems supported by said turret, a cup receiving chuck mounted on the outer end of each stem, means for rotating the turret to index the chucks with a ware finishing station, means for rotating said chucks, and cup finishing means adjacent the turret for removing clay from cups.

30. Apparatus for finishing dinnerware in the clay state which comprises, a rotatable turret, a plurality of radial stems supported by said turret, a cup receiving chuck mounted on the outer end of each stem, means for rotating the turret to index the chucks with a ware finishing station, means for rotating said chucks, and means adjacent the turret for trimming and burnishing cups.

WILLIAM J. MILLER.

REFERENCES CITED

The following references are of record in the file of this patent:

UNITED STATES PATENTS

| Number | Name | Date |
| --- | --- | --- |
| 1,202,863 | McCormick | Oct. 31, 1916 |